United States Patent [19]
Fantone et al.

[11] Patent Number: 5,661,816
[45] Date of Patent: Aug. 26, 1997

[54] IMAGE ANALYSIS SYSTEM

[75] Inventors: Stephen D. Fantone, Lynnfield; Peter T. Carellas, Winchester, both of Mass.

[73] Assignee: Optikos Corporation, Cambridge, Mass.

[21] Appl. No.: 382,517

[22] Filed: Jan. 31, 1995

Related U.S. Application Data

[63] Continuation-in-part of Ser. No. 156,399, Nov. 23, 1993, abandoned, which is a continuation of Ser. No. 780,916, Oct. 22, 1991, abandoned.

[51] Int. Cl.⁶ ................................................ G06K 9/00
[52] U.S. Cl. ................................................ 382/100
[58] Field of Search ........................... 382/100, 321; 356/124, 124.5, 128; 364/525

[56] References Cited

U.S. PATENT DOCUMENTS

| | | | |
|---|---|---|---|
| 3,870,415 | 3/1975 | Cornsweet | 356/124 |
| 3,930,732 | 1/1976 | Holly | 356/107 |
| 4,077,721 | 3/1978 | Mohon | 356/124 |
| 4,487,502 | 12/1984 | Fantozzi et al. | 356/124 |
| 4,767,215 | 8/1988 | Borodovsky | 356/124 |
| 4,873,653 | 10/1989 | Grosskopf | 364/525 |
| 5,066,120 | 11/1991 | Bertrand | 356/124 |
| 5,075,883 | 12/1991 | Friedman et al. | 356/124.5 |

FOREIGN PATENT DOCUMENTS

| 1598648 | 9/1981 | United Kingdom | G01M 11/02 |
|---|---|---|---|

OTHER PUBLICATIONS

"Measurement of two–dimensional optical modulation transfer function (MTF)", G. Lund, M. Azouit, SPIE vol. 192 Interferometry, pp. 166–173 (1979).

*Primary Examiner*—Jose L. Couso
*Attorney, Agent, or Firm*—Francis J. Caufield

[57] ABSTRACT

A system for quickly measuring and displaying in real-time a variety of performance characteristics of optical components such as lenses. The system is video based and is under the control of a computer which uses a windowing software program to provide the user with a graphical user interface by which the various components of the system and test lenses may be characterized and operated on through functions available via the interface. Lens performance measurements such as line spread and modulation transfer functions can be graphically and numerically displayed in real-time and/or recorded on other output devices or as files in computer memory.

15 Claims, 11 Drawing Sheets

```
┌─────────────────┐
│ OPERATIONS      │
├─────────────────┴────┐
│ VIDEO CONFIGURATION  │
├──────────────────────┴────┐
│ NEW VIDEO CONFIGURATION   │         ╭─ 80
├───────────────────────────┴──────────────┐
│ CAMERA  CCD AND FRAME GRABBER DATA WILL  │
│ BE SAVED IN MANUFACTURER. INI FILE       │
│                                          │
│ CAMERA NAME:   [                    ]    │
│                                          │
│ MANUFACTURER, MODEL: [              ]    │
│                                          │
│ SERIAL NO: [                        ]    │
│                                          │
│        [OK]    [CANCEL]                  │
└──────────────────────────────────────────┘
```

FIG. 8

```
                    ┌─────────────┐
                    │ OPERATIONS  │
                    ├─────────────┤
                    │ MOTORS      │        ╭─ 82
      ┌─────────────┴─────────────┴───────────────────┐
      │            MOTOR POSITIONS                    │
      ├───────────────────────┬───────────────────────┤
      │ ┌CURRENT POSITION─┐   │ ┌─INDIVIDUAL MOTORS─┐ │
      │   X    [ 0.0 ]        │    [ STAGE X ]        │
      │                       │  ┌SET TO─┐ ┌MOVE TO─┐ │
      │   Y    [ 0.0 ]        │  [     ]  [      ]    │
      │                       │  [SET POS.][MOVE MOTOR]│
      │   Z    [ 0.0 ]        │                       │
      │                       │  ┌──────────────────┐ │
      │   θ    [ 0.0 ]        │  │                  │ │
      │                       │  CALIBRATE SCROLL BAR │
      └───────────────────────┴───────────────────────┘
```

IMAGE ANALYSIS SYSTEM

REFERENCE TO RELATED APPLICATIONS

This application is a continuation-in-part of U.S. patent application Ser. No. 08/156,399 filed on Nov. 23, 1993 now abandoned, which, in turn, is a continuation of U.S. patent application Ser. No. 07/780,916 filed on Oct. 22, 1991, and now abandoned.

BACKGROUND OF THE INVENTION

1. Field of the Invention

This invention, in general, relates to lens measurement devices and, in particular, to a real-time lens testing system for quickly performing two-dimensional image analyses on a test lens or the like, including the determination of its modulation transfer functions (MTF's).

2. Introduction and Background of the Prior Art

The newest technologies for designing and producing higher quality optical systems of increasing complexity have also created a demand for lens measurement equipment that is sophisticated, flexible, and accurate. In addition, it must be easy to use and be able to provide a rapid indication of the quality of the performance of an optical system compared with its design expectations.

To fulfill such requirements, many branches of science have employed transfer functions which relate output response to a known input as, for example, measuring the performance of audio equipment, vibration isolation, seismology, and so on. As applied to optical systems, the Optical Transfer Function (OTF) has been developed, and it describes the response of optical systems to known sources. It comprises two components: (1) MTF which is the magnitude of the OTF, and (2) the phase transfer function (PTF) which is the phase component. Of most interest here is the MTF.

MTF is a measure of the ability of an optical system to transfer various levels of detail from object to image. Performance is measured in terms of contrast (degrees of gray), or modulation, produced for a perfect source containing the requisite detail.

Detail in an object or image relates to resolution and is customarily specified in line pairs per millimeter (lp/mm). A line pair is one cycle of a light bar and dark bar of equal width and has a contrast of unity where contrast is defined as:

Contrast=(Max−Min)/(Max+Min)

where Max is the maximum intensity produced by an image (white) and Min is the minimum intensity (black). Therefore, MTF is a mapping of contrast, measured in percent, against spatial frequency measured in lp/mm. This mapping is customarily normalized to a value of 1 at zero spatial frequency (all white or black).

One common MTF measurement is that of the eye: the ophthalmologist determines the response of the human visual system (lens and retina) to varying levels of detail—rows of letters. Hence, the doctor determines the frequency response of the patient's visual system.

The Phase Transfer Function (PTF) analogously determines the relative phase of the image as function of frequency. A relative phase change of 180°, for example, indicates that black and white in the image are reversed. This phenomenon occurs when the OTF becomes negative. Phase reversed images still show contrast and may have a substantial MTF.

MTF specifications are frequently used for describing the performance expected from lens designs so that actual systems can be repeatably tested to a standard. Some examples of the type of applications for lenses where MTF would be used include reconnaissance lenses, photographic objectives, and IR systems. The benefits of using MTF as a system specification are three-fold. First, many optical systems, other than the very simplest, employ numerous components or stages (lenses, film, eye, etc.) each one of which has associated with it an MTF that can be individually tested and verified. The system MTF is then equal to the product of the MTF's of the individual components. This is referred to as concatenation of MTF and allows for testing at the subassembly level.

Second, MTF, unlike interferometric based measurement, can be specified either at a single wavelength or over a range of wavelengths, depending on the application. Thus, MTF can provide full spectrum specification and testing.

The third benefit of MTF testing is that it is objective and universal. The test engineer is not required to make judgments of contrast, resolution or image quality. Therefore, the polychromatic MTF of an actual lens can be directly compared to the polychromatic MTF as determined by its design under conditions simulating the testing environment or that of another measurement instrument.

Instruments for measuring MTF are also commonly used in production environments as quality control tools because they do not require operators with a high level of optical training to produce meaningful test information indicative of lens performance.

The known fundamental methods for computing MTF include: discrete or continuous frequency generation, opto-mechanical scanning, and wavefront analysis. Recent advancements in precision mechanics and electro-optics technologies have spawned many practical variants of instruments for implementing the fundamental methods to provide for efficient measurement of MTF to very high accuracy.

The most direct test of MTF is to use a single frequency object and measure the contrast of the image directly. Discrete frequency measurement methods are commonplace: bar charts, USAF 1951 resolution targets, and eye charts are but some examples. A series kind of tests taken together can create a full MTF graph.

Improvements over discrete frequency methods involve providing various mechanisms for continuously varying the source frequencies while constantly measuring the image contrast. An example of this approach utilizes a rotating radial grating with a slit aperture as an object. Here, a pinhole is placed in the focal plane of the lens, and the light passing through it is monitored with a detector. As the grating rotates, the individual black and white bars are swept across the pinhole. By moving the grating relative to the slit, the spatial frequencies of the object can be varied. The detector output is synchronized to the rotation and is a direct measure of the MTF at the radial grating spatial frequency and/or its harmonics.

The obvious advantage to frequency generation methods resides in the fact that output is a direct measurement of MTF. The major disadvantage is that these methods require the simultaneous manipulation of sources and detectors, which limits instrument flexibility.

Most commercially available MTF measurement instruments use a form of image scanning. Scanning systems operate on the principles of linear system theory—the image produced by the lens with a known input, such as an infinitesimally small pinhole, is determined, and the MTF is computed from this information.

Measuring MTF with this method is the optical analogy of measuring the frequency response of an audio speaker. The image produced by a lens of an infinitely small source of light is a more or less perfect blur (diffraction or geometric) much like the more or less perfect tonal output of a speaker in response to a single input pulse. The qualities of the blur, its departure from theoretical perfection, similarly indicates the frequency response of the lens.

The image spatial profile is termed the line spread function (LSF) or the point spread function (PSF), for one and two-dimensional scanning. An LSF is commonly produced by edge scanning an image of a point source with a mechanical obscuration (knife edge) while monitoring the intensity throughput, and then differentiating the output. Alternatively, scanned output can be produced by using a slit source and moving a pinhole or slit. The vertical or horizontal orientation of the knife determines whether sagittal or tangential scanning is achieved. If the knife edge possesses a right angle, and it diagonally traverses the image, it can in sequence scan in the horizontal and vertical directions, yielding both sagittal and tangential edge traces. The Fourier transform of the LSF is the one-dimensional MTF.

For a true impulse response function to be derived, a finite source size must be corrected or its state of correction must be taken into account in any subsequent analysis. Through linear system theory, it can be shown that this correction or accounting can be accomplished by dividing the measured MTF by the Fourier transform of the source, such that the corrected MTF data is the quotient of the uncorrected MTF data divided by the proper correction factor at discrete frequencies:

$$MTFcorrected(f) = MTFuncorrected(f)/Correction\ factor\ (f)$$

Computer algorithms can quickly correct measured MTF data for finite aperture sizes (slits, pinholes, etc.). The fully corrected data can then be compared to the theoretical performance.

Through-focus MTF mapping can be generated by opto-mechanically scanning different focus planes. The effects of spherical aberration, defocus, astigmatism, field curvature and chromatic aberration, and other image errors and features can be assessed from these curves. By choosing a single frequency and comparing the MTF at these focal planes, the desired focus for best (or balanced) performance can be achieved.

Very high resolutions (without image magnification) can now be achieved with scanning systems equipped with precision lead screws driven by stepper motors or accurate synchronous motors.

A drawback to opto-mechanical scanning methods is the duration of time to perform the scan. Sampling theory and the lens-under-test parameters dictate the number of data points required for a properly sampled image. Consequently, insufficient sampling can significantly affect the accuracy of the MTF. Therefore, opto-mechanical scans often require upwards of 30 seconds to complete a measurement.

The MTF of a system may also be measured with an interferometer by one of two methods: auto-correlating the pupil function of the lens-under-test or analyzing the PSF calculated by Fourier transforming the pupil wavefrom. This is very convenient for systems which are suitable for testing in an interferometer, do not exhibit significant chromatic aberrations, and whose wavefrom errors do not vary substantially over the wavelength of interest. With opto-mechanical scanning or discrete frequency methods, the wavelength range can be adjusted by using wide band sources and spectral filters for full polychromatic testing. Interferometers rely on monochromatic sources (i.e. lasers) so that MTF is only available at the wavelengths of available sources.

In addition, since phase measuring interferometers have limited wavefront sampling capabilities, the wavefront should be fairly well corrected. Lenses with excessive wavefront errors are difficult to measure with interferometers.

While a variety of instruments have been developed based on the above principles, there is still a need for low-cost, fast, and simple to use instruments for performing image analyses, such as the measurement of the modulation transfer function of optical components and systems, and therefore, it is a primary object of the present invention to provide such an instrument.

It is another object of the present invention to provide an instrument for measuring modulation transfer function in real-time while providing a convenient display of the results.

It is another object of the present invention to provide an instrument for measuring the performance of optical systems by performing real-time, two-dimensional image analysis and displaying the remits through the use of computer system with a graphical user interface.

Yet another object of the invention is to provide versatile and portable apparatus for measuring modulation transfer function.

Other objects of the invention will, in part, appear hereinafter and, in part, be obvious. A full understanding of the invention will be had from the detailed description when read in connection with the accompanying drawings.

SUMMARY OF THE INVENTION

This invention is a low-cost, fast, computer controlled system for quickly performing and displaying real-time image analyses results from optical systems under test to characterize their performance and, in particular, to measure their modulation transfer function. The system uses a low-cost video camera to capture the image produced by the lens under test and generate a standard video signal representing the intensity of the image. Rather than use opto-mechanical methods of scanning the image like, e.g., knife scanning, the system uses electronic video array sampling techniques to produce the line spread, point spread, or edge traces. Its features include the use of a two-dimensional video detector in conjunction with a windowing software program to simultaneously compute both sagittal and tangential MTF curves and line spread functions in real-time, while displaying the results in convenient graphical or numerical form, or outputting the results to other storage or display devices, or writing files to memory.

The system and its operation are under the control of a windowing computer program which provides the user with a convenient graphical user interface for characterizing the various components of the system itself, identifying test lenses and their performance specifications, and carrying out, displaying, and recording a variety of image analysis operations, including the calculation and display of the two-dimensional MTF. Because the windowing program structure and functionality are designed with flexibility in mind, the system may be built from a variety of compatible standard optical bench hardware readily available from well-known manufacturers of optical instrumentation supplies.

BRIEF DESCRIPTION OF THE DRAWINGS

The structure and operation of the invention, together with other objects and advantages thereof, may best be understood by reading the detailed description to follow in connection with the drawings wherein the same reference number is used throughout the drawings to identify particular parts wherever they appear and wherein.

DETAILED DESCRIPTION

Figure 1:
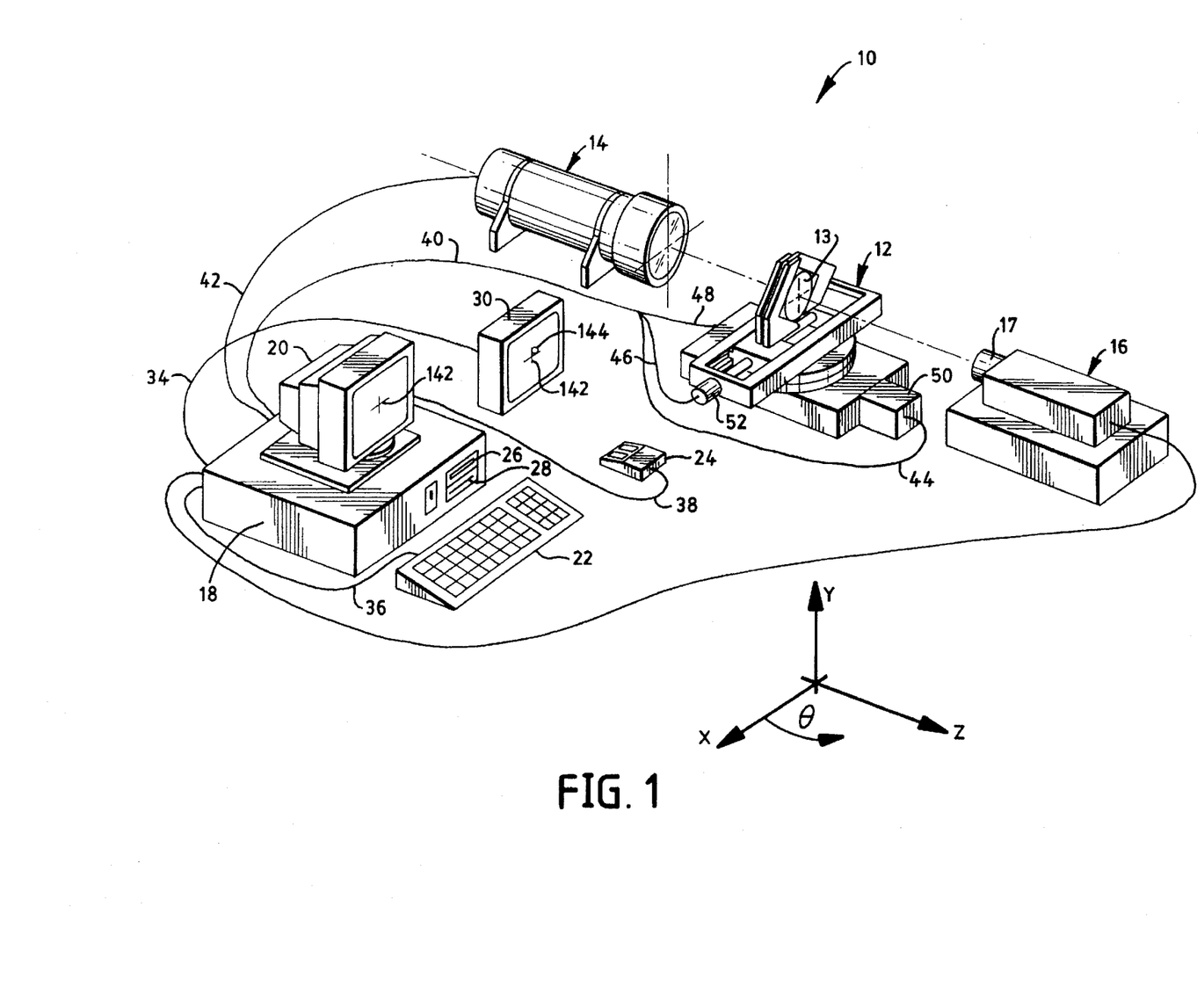
FIG. 1 is a diagrammatic perspective of the inventive testing system illustrating its various major components.

The measurement system of the invention is shown at 10 in FIG. 1 where it can be seen to comprise: a motor driven table 12 for holding and translating one or test lenses 13, a source 14 for presenting a target to test lens 13, a video camera 16 including an objective 17 therefor, computer 18 with a "386" microprocessor, a monitor 20 for displaying output from computer 18, a 101-key keyboard 22 for providing input to computer 18 via key commands and windowing dialog boxes, a mouse for pointing at and activating various graphical elements, such as icons and menu options displayed on monitor 20, disk drives 26 and 28 for receiving 3½ and/or 5¼ inch microfloppy disks which can carry software program information or other data to be input to computer 18 or on which various numerical or graphics files or other data files can be written, and a live video monitor 30 for observing the image formed on the detector of video camera 16. Various cables are provided for connecting the system components; namely, a cable 32 carries the video signal from video camera 18 to a frame grabber board 50 (see FIG. 3), which is physically located in one of the expansion slots of computer 18 but otherwise not shown. The video signal from camera 16, which is preferably a standard RS 170 video signal, but may also be a European or other standard, is split in a well-known manner and sent to live video monitor 30 via a cable 34. Cable 36 connects keyboard 22 with computer 18, cable 38 connects mouse 24 with computer 18, cable 40 connects with cables 44, 46 and 48 which, in turn, are connected to motors 50 and 52 and two other motors (not shown) for moving test lens 13 along standard orthogonal x, y, z axes and rotating it about its nodal plane around the z-axis. The other end of cable 40 connects with a motor controller board located in one of computer 18's expansion slots, not shown in FIG. 1 but designated at 53 in FIG. 3. Motors 50 and 52 and the others are preferably precision stepper type motors of well-known construction and capable of positional control to the precision of micrometers. As will be appreciated, the essential purpose of motor driven table 12 is to introduce relative motion between test lens 13 and either the target presented to it or video camera 16. While illustrated in the foregoing fashion, it will be recognized that such relative motion may also be achieved by moving either video camera 16 or source 14 either by translation or rotation or some combination of both, and this may also be done not strictly mechanically but by use of optical means as well. For example, rotating mirrors may be introduced in the optical path of system 10 to change the apparent angular orientation of test lens 13 to the incoming target or exiting image formed by it, or by means of introducing a shear by moving video camera 16 or source 14 along the x-axis.

Computer 18 may be any well-known type as, for example, a 25 Megahertz AT 386 or compatible running MS-DOS® 3.3 and Microsoft® Windows™ 3.0. Video monitor 20 can be of any brand which accepts a standard RS 170 video signal. Burle and Hitachi monitors of this type have been successfully used. Examples of video camera 16 which have been successfully used have been the Burle model TC650E Series camera having 510 H×492 V pixels on a 6.4×4.8 mm chip and Sanyo's VDC 3850 or VDC 3824 having 572 H×485 V picture elements on art image size of 8.8×6.6 mm, both operating with the automatic gain (AGC) controls off.

System 10 is under the control of a windowing computer program with a graphical user interface (GUI) to be described in further detail hereinafter but, briefly, functions to allow the user to input the characteristics of the target presented to test lens 13, the identity and specifications of test lens 13, the characteristics of video camera 16 and its objective 17, the system test setup, where the image formed by test lens 13 is to be analyzed, and what performance characteristics of the test lens are to be measured and displayed.

Figure 2:
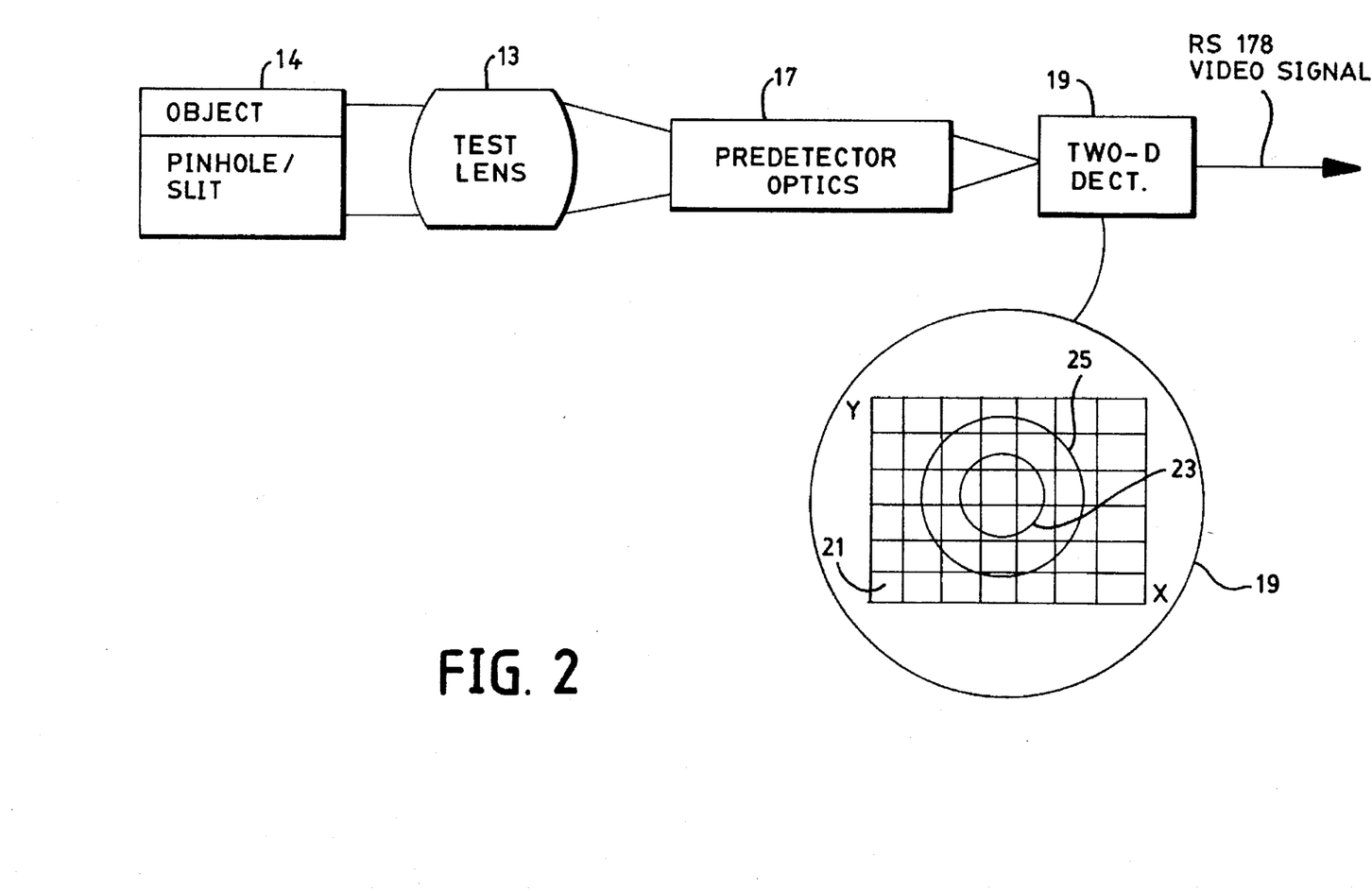
FIG. 2 is a schematic block diagram of various components from FIG. 1 used to generate a video signal of an image formed by an optical component under test.

As best seen in FIGS. 1 and 2, a well understood target is presented to test lens 13 via source 14. Source 14 comprises, in a well-known manner, a source of illumination and optics for establishing the apparent location of the target. Preferably, the output of source 14 is from an arrangement has a light source focused on the target which, in turn, fills the numerical aperture of collimating optics. The MTF of the target itself is known and the target is constructed in a well-known manner such that its spatial frequency content encompasses that expected of the test lens and its intensity level or modulation are sufficient to generate appreciable signal levels. The target may be a slit for one-dimensional analysis or pinhole for two-dimensional analysis or any other well-behaved and analytically predictable target. In addition, the target may be at infinite or finite conjugates. In either case, its characteristics are definable in well-known terms that are inputted into the system program for purposes of performing the various image analysis operations to be subsequently described. In the case of two-dimensional MTF determinations, the target is preferably a pinhole which is imaged more or less perfectly by test lens 13 at some focal or measurement plane behind it. This image, in turn, is re-imaged by objective 17 onto video detector 19 of video camera 16. The image has an intensity distribution from which the line spread function of the test lens can be derived along at least one azimuth. Video detector 19 is preferably a two-dimensional CCD with approximately 500 plus×450 plus pixel elements about 8 to 10 micrometers square and corresponding spatial frequency. However, it need not be a CCD, but can be any camera which generates a standard video signal, which is a two-dimensional representation of how the intensity of the image changes and which may operate in the IR or UV regions of the spectrum as well as the visible. As seen in FIG. 2, the image of the blur circle formed by lens 13 on CCD 19 can be made larger or smaller in accordance with the magnification of objective 17. Thus, for a low magnification or a magnification of unity, the image as at 23 covers an area of, say, about 2×2 pixels square to provide the system with one first effective apparent spatial resolution. If the apparent resolution of detector 19 needs to be higher, it can be increased by increasing the magnification of objective 17 to provide a larger image of the blur circle on detector 19 such as that shown, for example at 25, which covers an area of 4×4 pixels square. In other words, the effective spatial resolution of detector 19 can, as required, be increased simply by changing the magnification of the image formed by test lens 13, and this information is provided to the program as part of its setup or configuration so that it will know what the testing conditions are for purposes of performing the image analysis calculations it carries out. What is essential here is that the pixel geometry is known.

Figure 3:
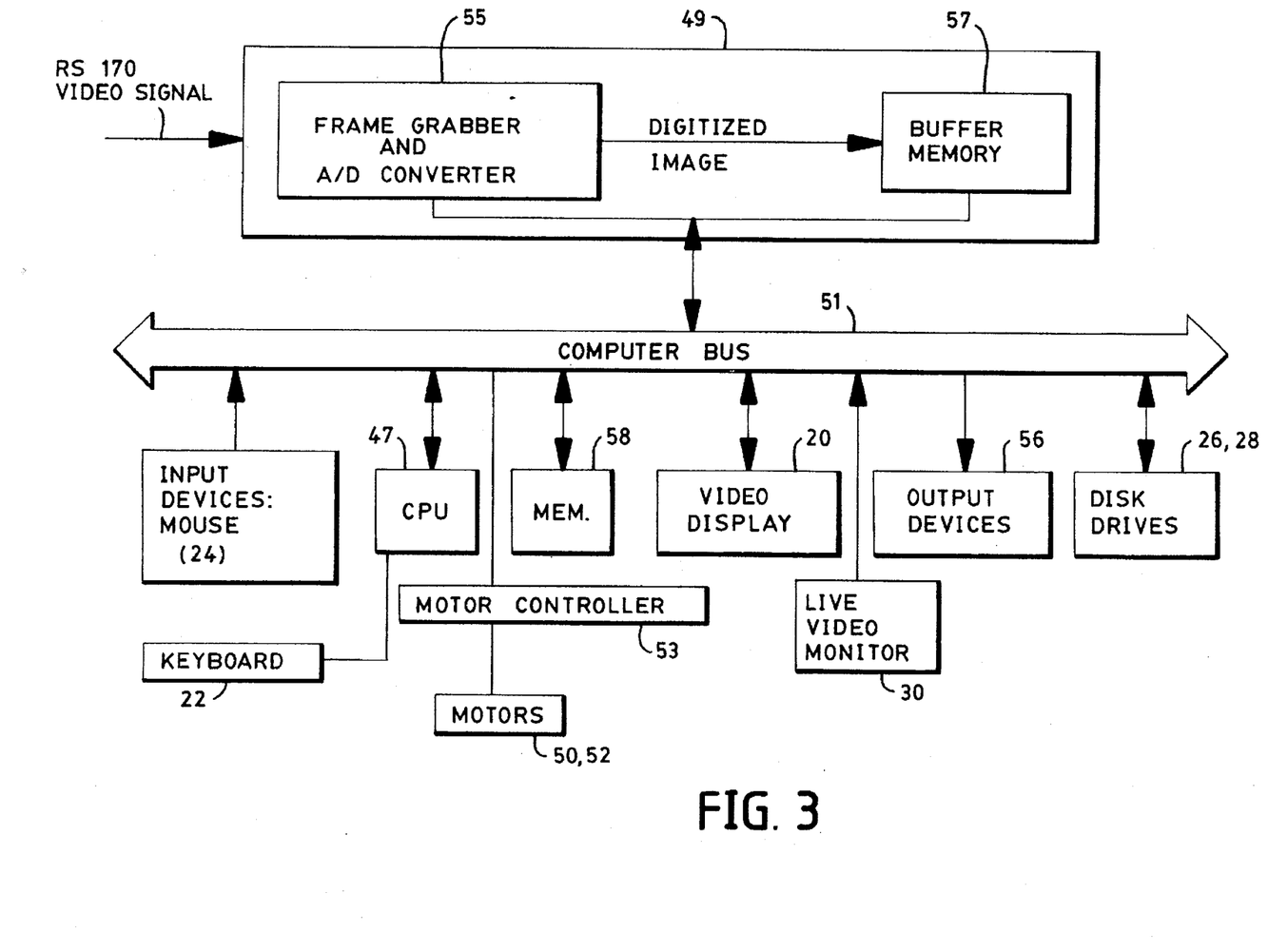
FIG. 3 is a schematic block diagram of various system components from FIG. 1 for performing image analysis and displaying, controlling, and operating the system.

As mentioned, the output of video camera 16 is in the form of a standard RS 170 analog video signal as shown in FIG. 3. This output, which represents the intensity distribution in the image formed by the test lens, is fed into frame grabber 49 where it may be amplified and converted via an A/D converter 55 into a digitized image which is then stored in a buffer memory 57. The digitized image is formed at the repetition rate of the frame grabber board 49 so that the contents of buffer memory 57 are repeatedly updated until such time as a command is received in a manner to be described to freeze the contents of buffer memory 57 and transfer them to computer 18 via its bus 51. Frame grabber 49 may be of the type manufactured by EPIX, New Media Graphics, or Imaging Technology, Inc.

Bus 51 also has connected to it a computer CPU 47, memory 58 in the form of hard drives, RAM, and KOM, video display 20, disk drives 26 and 28, input devices including mouse 24, motor board 54 connected via a well-known motor controller 53, live video monitor 30, and output devices 56 which could be, for example, printers or plotters or the like. All of the devices connected to bus 51 are under the control of a bus interrupt management scheme well-known in the related arts. Keyboard 22 is connected directly to CPU 47.

Once the digitized video image is transferred to computer 18, it is thereafter operated on by internal program algorithms to analyze, display, print or record the performance of test lens 13.

The program for carrying out the system functions already described is based on a windowing environment such as X-Windows, Microsoft® Windows™ Version 3.0, or OS/2 Presentation Manager. The preferred implementation is by way of Microsoft® Windows™ Version 3.0, but it could just as easily have been implemented via any other with similar features.

As will be explained, the user of system 10 has two software operational modes—manual and automatic (macro-driven). Data is acquired by choosing either "Real-time scanning" or "Through-focus scanning". The user visually selects the area of the image of interest with cross-hairs, then witnesses the acquisition process. And, then with the push of a mouse button, captures the data into memory. Captured data is then put into a sub or child-window on the main screen, and can then be reviewed, compared to specifications or other pre-existing data, arranged for preferable viewing, and printed. At this point, Windows 3.0 features are of full advantage. Any function of the program, including the entire data entry, acquisition, capture, and print processes, can be fully automated by use of the macro language. Therefore, users can set up pre-set routines for the lenses under test and implement these routines as desired. For example, test routines can be set for (1) eyepiece, (2) objective, (3) relay lens, etc., and called up from memory as appropriate. The user can have stored specifications for any number of pre-identified test optics.

The program also has the ability to drive up to four individual motors directly from the code. The motors can be utilized to set focus, adjust spacings, change incident angle, rotate mirrors, etc. The motor movements can be contingent upon retrieved data. For example, the motor may continually focus the lens under test until the MTF exceeds some predetermined level.

The interface and software architecture developments that are characteristic of the recently developed windowing environments have been advantageously exploited in the implementation of the invention.

The programs' functionality has been carefully designed to permit the use of readily available system components from different manufacturers to provide a high degree of flexibility and portability by allowing the user to inform the system what components are being used, how they are configured, and under what conditions they will be used to carry out the required tests.

Traditional computer user interfaces were command line driven, forcing a user to respond and adapt to an application programs' processing sequence (as required by early batch processing models—one program at a time; one line at a time). Essentially, the program, its structure, and its limited methods of giving and receiving input (only capable of processing character data) drove user behavior.

During the early 1970s, research began on alternative computer architectures which would provide new methods for the way in which information is processed. With it's introduction of the Star Workstation in 1981, Xerox's Palo Alto Research Center (PARC) introduced the first commercially available Graphical User Interface (GUI). GUIs are operating systems/environments which are event-driven (unlike the sequential processing required in earlier architectures) and displays are outputted on a bit mapped graphical display. Event-driven processing models allow the user to dictate work sequences such that the computing environment supports an individuals' way of thinking and working (computer adapts to the user rather than the user adapting to the program). This change in processing also created a significant change in software development architectures, design methodologies, programming techniques and tools to support GUI-based application development.

Windowing environments are an implementation of Graphical User Interfaces. There are a number of windowing architectures based on various hardware/software and industry standards. Due to their commitment to standards and graphical orientation, they tend to be easier to learn and use and enhance application integration (data sharing). Microsoft® Windows™ is one of these implementations.

Most windowing environments share a number of characteristics such as:

A Graphical Extension to the operating system

Standard interface and user interface objects such as Windows, Icons, Menus, and dialog boxes (or buttons) providing a consistent "look and feel" to users regardless of the application. Windows provide a view of data currently in the computer. Icons are small graphical objects which represent either commands or active processes or programs. Menus provide a consistent mechanism for selecting application functions or navigation.

Multi-tasking

Standard Application Programming Interface supporting the user interface and processing model. This provides a programmer with a set tools and a re-usable library of routines (code) to reduce application development time. These routines automatically provide adherence to MS windows standards (ie creation of user-interface objects, managing computer resources, message handling, managing the graphics display, and so on) while still allowing development flexibility and creativity.

Having described the general features of the windowing environment, the specific functions of the particular program for use in carrying out the methods of measurement of the present invention will now be taken up. The supporting software code for providing those features was implemented in the "C" language through the use of Microsoft's Windows Developers Toolkit™.

Figure 4:
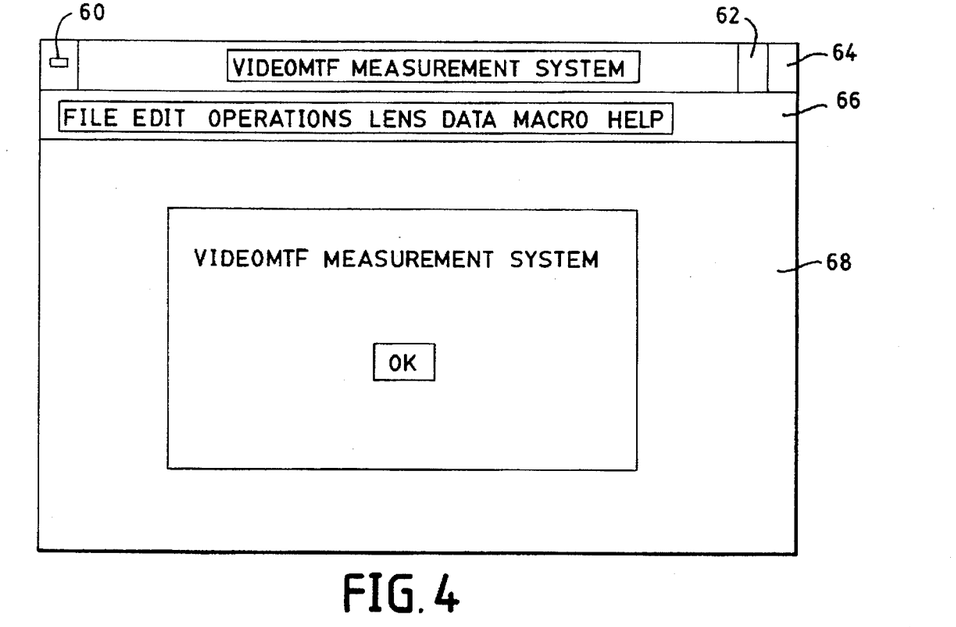
FIG. 4 is the main window of the system graphical user interface software program along with its primary menu bar operations, screen work area and command buttons.

Referring now to FIG. 4, there is shown the program Main Window which appears after activating its icon which is provided in the usual way in the Microsoft Windows Main Menu. As can be seen the name of the program which appears in the title box of the Main Window is "VIDEOMTF MEASUREMENT SYSTEM". In the upper left corner, designated at 60 is the Control Menu Box which provides the standard Windows functions of Restore, Move, Size, Minimize, Maximize, Close and Switch To . . . , and in the upper right corner are the Minimize and Maximize control buttons designated, respectively, as 62 and 64. The menu bar with its functions, "File", "Edit", "Operations", "Lens Data", "Macro", and "Help" are shown at 66, and the window work area at 68. Appearing in window work area 68 is a logo with an "OK" control button which, upon actuation, causes the program to be loaded as a windows application and then the logo disappears permitting the user to interface with the application.

Figure 5:
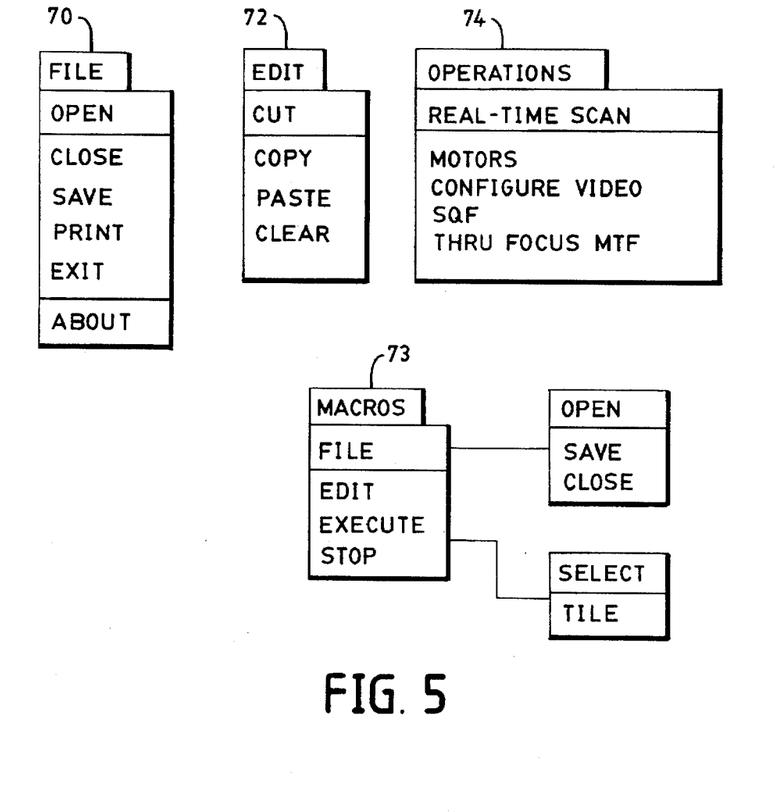
FIG. 5 illustrates the drop-down menus from the "File", "Edit", "Operations" and "Macro" functions available as options under the main window menu bar.

FIG. 5 shows at 70 the drop-down menu appearing in response to activating the "File" option from menu bar 66 and its options have the following functions:

| Option | Description |
| --- | --- |
| "Open" | Displays a dialog box in which the user opens a file which may include information describing various system components, lens specification, configurations, data, etc. |
| "Close" | Displays a dialog box in which the user closes a file providing it with a name and location. |
| "Save" | Saves a file to a designated directory |
| "Exit" | Exits the program and returns to Windows Main Window or an MS-DOS Executive window. |
| "Print" | Displays a dialog box in which the user the current file or other designated file. |
| "About" | Provides information about file activities. |

At 72 is shown the "Edit" drop-down menu where its options have the following function:

| Option | Description |
| --- | --- |
| "Cut" | Moves text out of a file and into Clipboard, a temporary storage device that holds text being moved from one file to another. |
| "Copy" | Copies highlighted text into Clipboard. |
| "Paste" | Transfers the contents of Clipboard to another window. |
| "Clear" | Clears the contents of the screen buffer. |

The "Macros" option is shown at 73. With it, the user may create, edit, execute, stop, save and close files which include sequences of commands. The commands allow setting of all configuration, data, execution of testing sequences, communication and status checking of input/output ports, and algebraic and mathematical functions. These latter functions allow analysis of measured data, comparison to stored values and conventional algebraic operations. For instance, the macro language can provide for the calculation of the ratio of MTF's measured at different spatial frequencies, or even comparison of the MTF's as measured on two different lenses. The macro language can prompt the user for input and inform the user of the status of the macro execution. The macro language is also of great utility in standardizing a particular set of test sequences and automated testing sequences. In the latter case, the macro language can check the status of an I/O port to see if a lens has been loaded for test. If the indicated status is yes, then the test sequence can be executed and comparison of the results can be made on a go/no-go basis or some other performance criteria made. The results of these tests can then be communicated through output ports to indicate test results. In this manner, system 10 can be used for as a real-time automated production tester. Other macro applications are possible by recording any sequence of available system functions.

Figure 6:
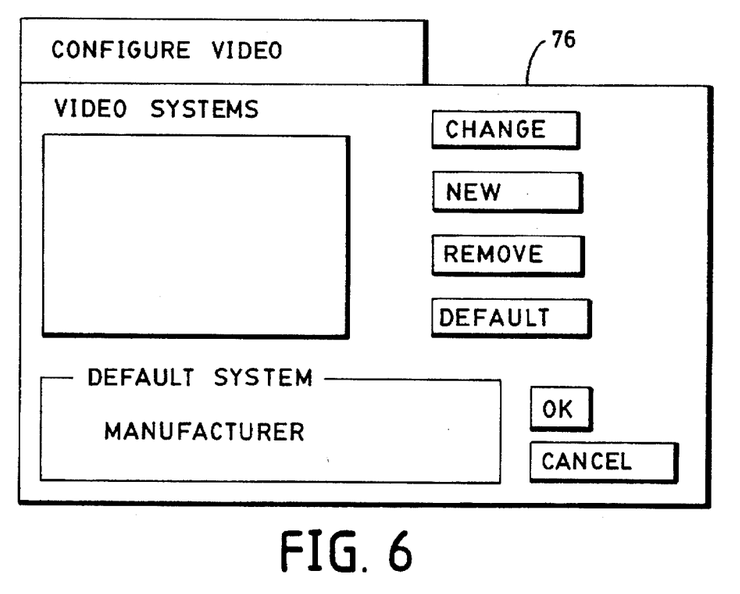
FIG. 6 show the drop-down menu generated from selecting the "Configure Video" function under the "Real-Time" option of FIG. 5.
Figure 7:
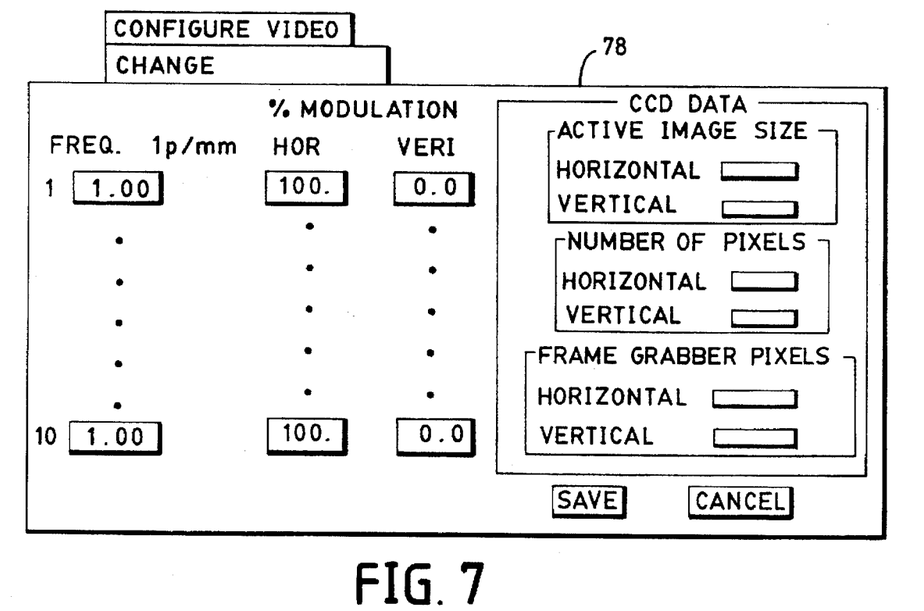
FIG. 7 shows the pop-up menu, dialog boxes, and command buttons provided under the "Change" function from the drop-down menu of FIG. 6.

As mentioned previously, system 10 has a great deal of flexibility designed into it which permits it to be built of standard, readily available components. One of the program's features which permit this is the "Configure Video" option available under the "Operations" drop-down menu designated at 74. On activating the "Configure Video" option, the user is presented with another drop-down menu shown at 76 in FIG. 6. Here, the user may elect to introduce "New" information about video camera 16, "Remove" current information, use "Default" information, or "Change" current information. With any of these elections, the user is presented with a pop-up menu with the dialog boxes and control buttons typically illustrated at 78 in FIG. 7. On the left of 78, the user fills in the horizontal and vertical percentage modulation of two-dimensional video detector 19 as a function of spatial frequency specified in 1p/mm. This information is supplied by the manufacturer of the video camera selected. On the fight of pop-up menu 78, information the user inputs is the horizontal and vertical active image size, number of pixels, and frame grabber pixels. Selecting the "Save" command button records this information as a data file.

Figure 8:
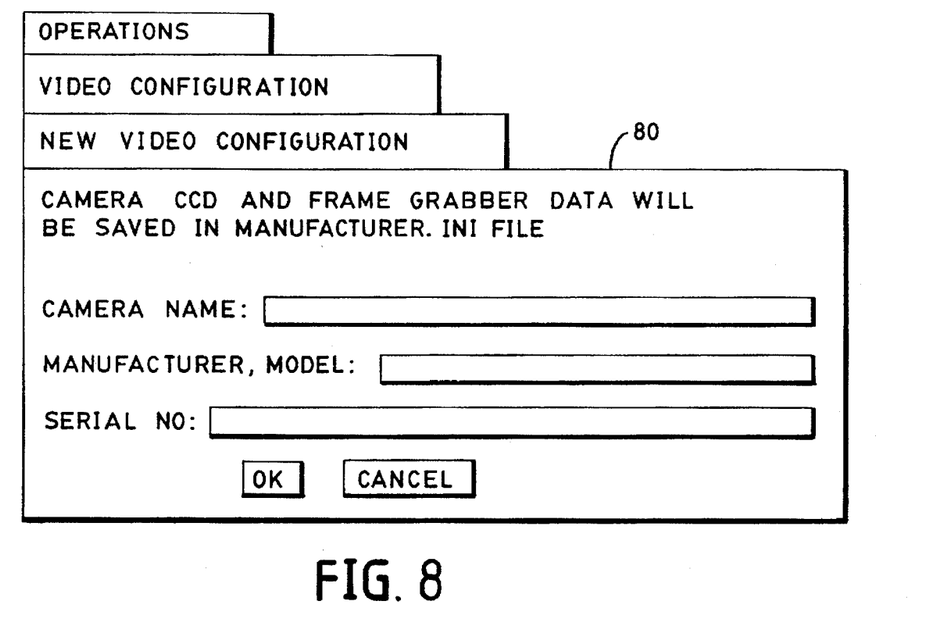
FIG. 8 shows the pop-up menu, dialog boxes, and command buttons available on activating the "New" selection of the drop-down menu of FIG. 6.

On selecting the "New" option of drop-down menu 76, pop-up menu 80 of FIG. 8 appears, prompting the user to input information about video camera 16 in the various dialog boxes including its manufacturer, name, model, and serial number. On selecting the "OK" command button, this information is stored in a file called "manufacturer.ini".

Figure 9:
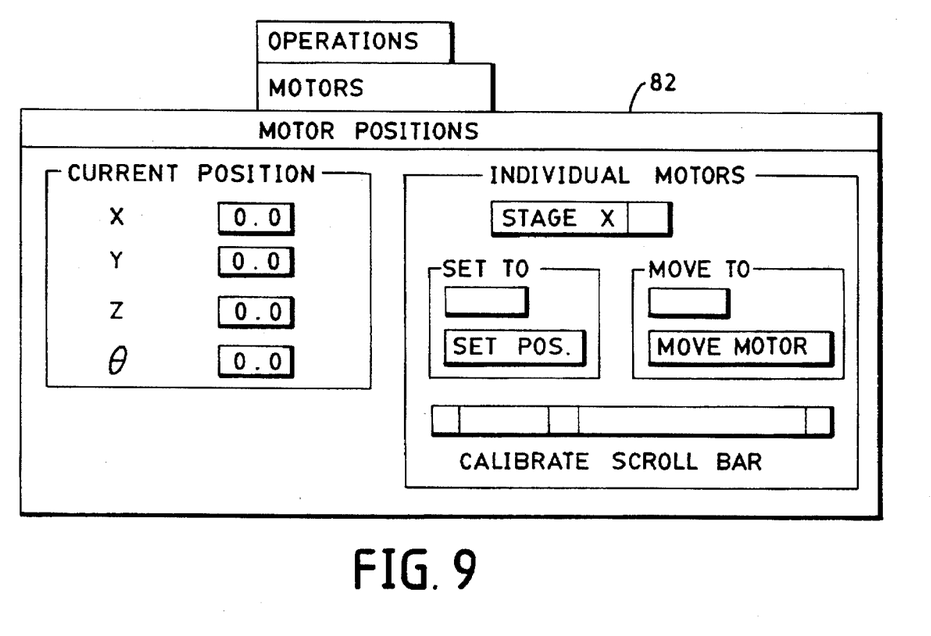
FIG. 9 shows the pop-up menu, dialog boxes, and command button provided from choosing the "Motors" function under "Operations" as shown in FIG 5.

Referring now to FIG. 9, there is shown at 82 the drop-down menu used for controlling the various motors (50, 52, etc.) associated with stage 12 for positioning a test lens 13. Here, on the left the current position of test lens 13 is specified in x, y, z, and θ, and on the fight, the user inputs for each coordinate an initial or set position and a move position representing the range of movement over which the performance of test lens 13 is to be measured. This feature enables through-focus studies to be conducted to determine where, for example, the plane of best focus resides, permits the measurement of performance at various field and off-axis angular positions as will be explained more fully hereinafter. The "Calibrate Scroll Bar" shown is used for setting switches which limit the range of motion over which test lens 13 may travel in each direction. As mentioned before, motor controller 53 operates in response to the inputs provided under pop-up menu 82 thus providing a means for precisely positioning and moving optical components to be measured with system 10.

Figure 10:
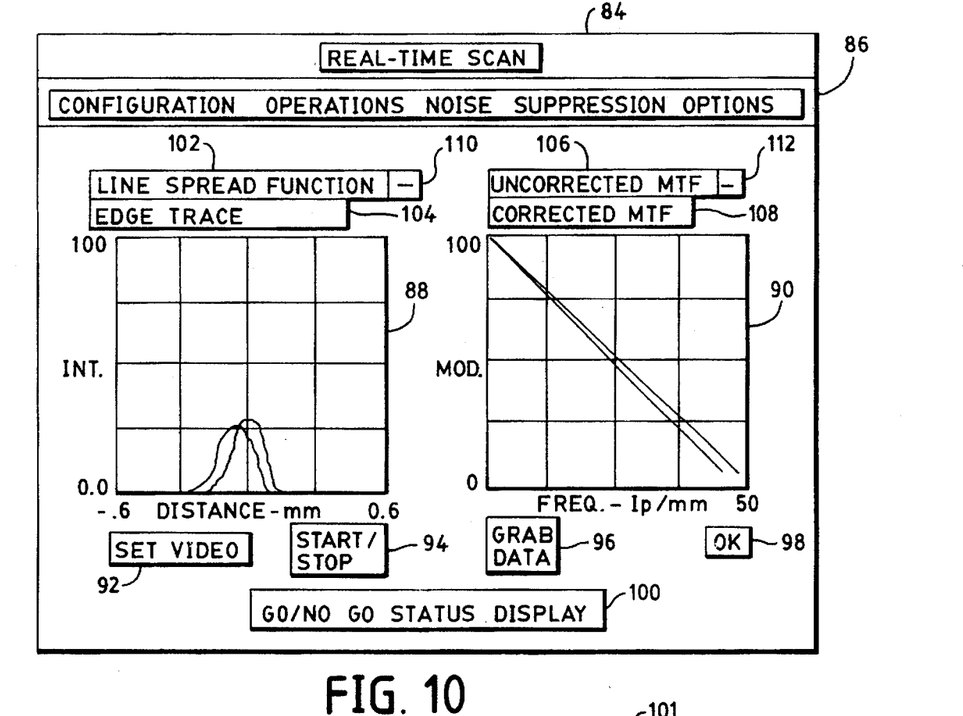
FIG. 10 shows the sub-window, menu bar functions, and command buttons generated in response to selecting "Real-Time Scan" under the "Operations" drop-down menu of FIG. 5, showing graphical displays of line/edge traces, corrected/uncorrected MTF and a variety of other functions.

On selecting the "Real-Time Scan" option of drop-down menu 74 of FIG. 5, sub- or child-window 84 of FIG. 10 appears. Under window 84, the user selects what part of the image formed by test lens 13 is to be used for measurement purposes, what kind of measurements are to be made, whether they are to be corrected or uncorrected, the test or set-up conditions such as the level of ambient light and whether the measurements are to be compared on a "Go/No-Go" basis with performance specifications previously provided. As can be seen, the title of window 84 is "Real-Time Scan" to indicate that the image is analyzed in real-time with the results displayed on video monitor 20 as the scanning measurements take place. Scanning is done at a known rate that preferably repeats faster than can be detected by an observer so that he is never visually aware that measurements are being continuously updated and displayed until such time as one of them is captured or "grabbed" in a manner to be described.

As seen, window 84 includes menu bar 86 whose options include the following functions: "Configuration", "Operations", "Noise Suppression", and "Options" which have the following meanings and purpose:

| Option | Description |
|---|---|
| "Configuration" | Allows the user to specify the characteristics of selected components of the test setup and the conditions of test. |
| "Operations" | Permits the gain and offset of the video detector 19 to be set in order to compensate for ambient fight level. Here the source 14 is shut off or detector 19 blocked and the video signal level monitored and the offset adjusted so that signal strength due to surrounding light can be nulled out. To adjust gain or measure pixel responsivity, a known level of uniform light is presented to video camera and the gain can be adjusted or individual pixel response measured and stored for future use in carrying out calculations. |
| "Noise Suppression" | Again, gain can be adjusted to improve signal to noise ratio. |
| "Options" | Allows the user to write to file, print or send to another type of output device. Allows the use of statistics to characterize groups of test lenses 13 and to view specifications. |

Figure 11:
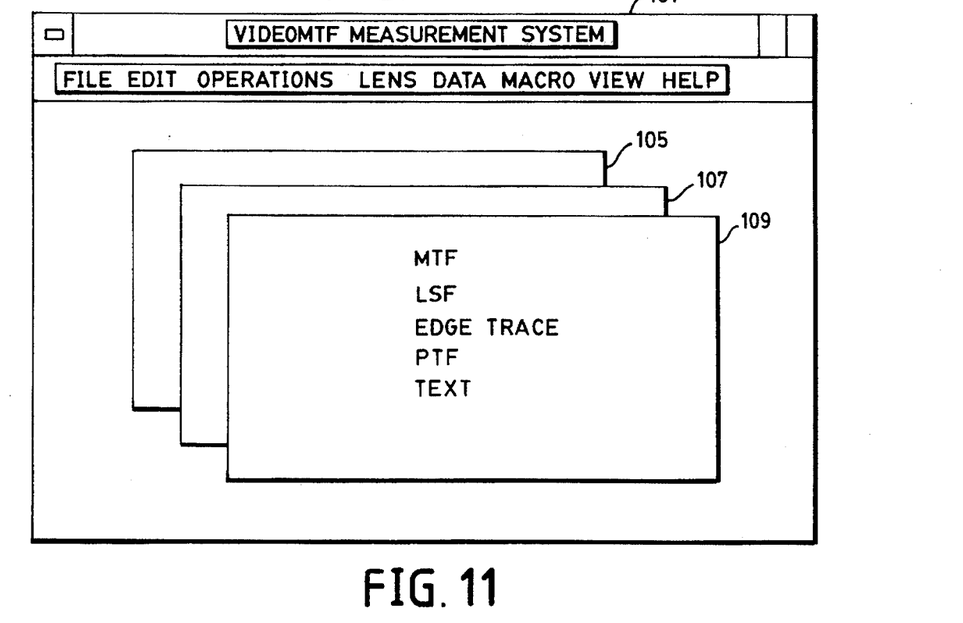
FIG. 11 shows the window, menu bar, and display possibilities generated in response to activating the "OK" command button in the "Real-Time Scan" sub-window of FIG. 10.

On activating the "Configuration" option of menu bar 86, drop-down menu 120 of FIG. 11 appears with pop-up menus 122, 124, 126 and status-line 128 as further options under it. With the "Select" option under drop-down menu 120, the user has the following opportunities to configure the components of system 10 under the drop-down window 122 of FIG. 13: "View" them for current values, create "New" configuration, use the "Default" values provided at the point of manufacture, "Remove" current values, or activate command button "OK" to return to the previous level.

Figure 14:
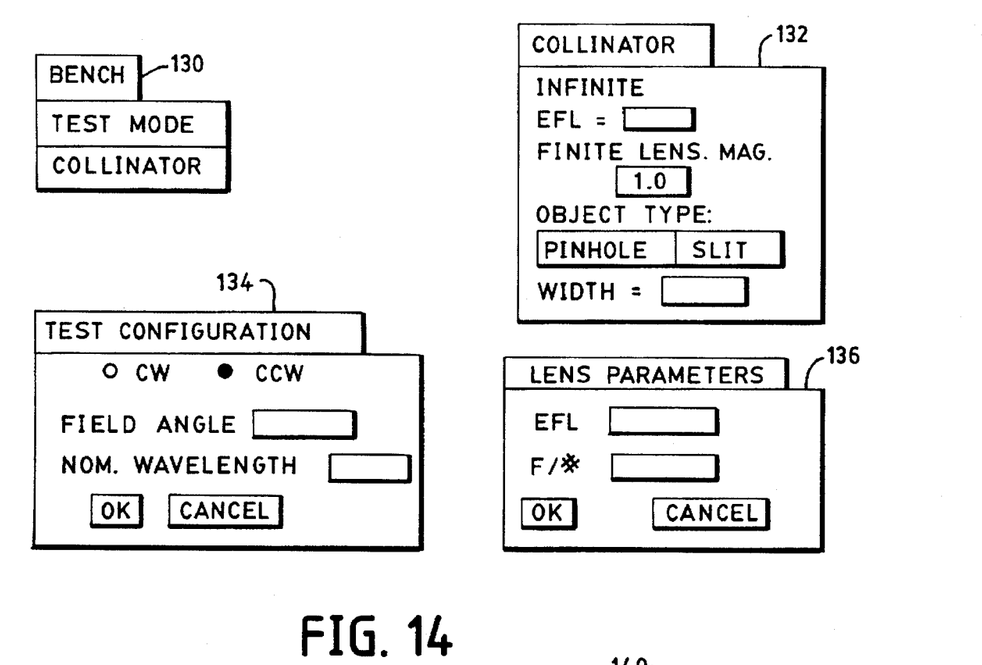
FIG. 14 shows the pop-up menus, dialog boxes, and command buttons generated in response to making various selections from the after activating the "Change" function under the drop-down menu of FIG. 13.

Activating the "Change" option of drop-down menu 120 produces drop-down menu 124 whose options, in turn, produce pop-up menus 130, 132, 134, and 136 shown in FIG. 14. Selecting "Lens" in menu 124 produces pop-up menu 134 which has dialog boxes calling for information specifying field angle and nominal wavelength, both of which will be known to the operator by virtue of information about the angular of position from the motors option under menu 82 of FIG. 9 and manufacturers data on source 14. "CW" and "CCW" specify the sense of the field angle in the fight hand X, Y, Z coordinate system.

Pop-up menu 132 requires entry of the effective focal length of source 14, whether it is a pinhole or slit, its width, and the magnification of objective 17 so that the effective spatial frequency of detector 19 will be internally known for calculation purposes. Given the nature of the source as a slit or pinhole, along with the "EFL" of the source collimating optics, informs the system what internal corrections need to be applied to the algorithmic calculations, particularly accounting for the MTF of the object using linear concatenation principles as described earlier.

Test lens parameters are entered via pop-up menu 136 which requires the lens effective focal length and f/number (F/#).

Figure 13:
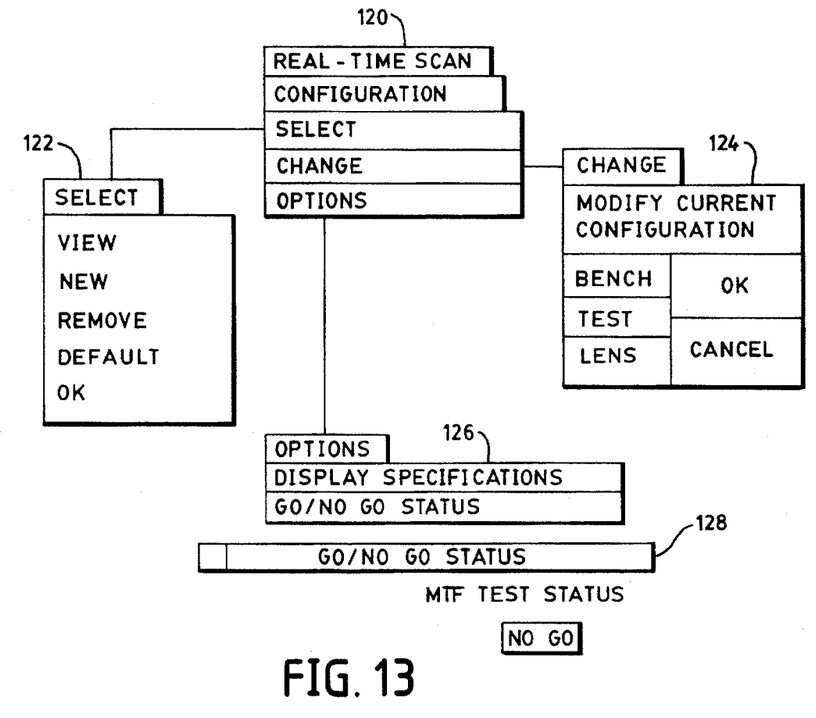
FIG. 13 shows the drop-down and pop-up menus generated in response to making various choices of functions available under the menu bar "Configuration" function of FIG. 10.
Figure 18:
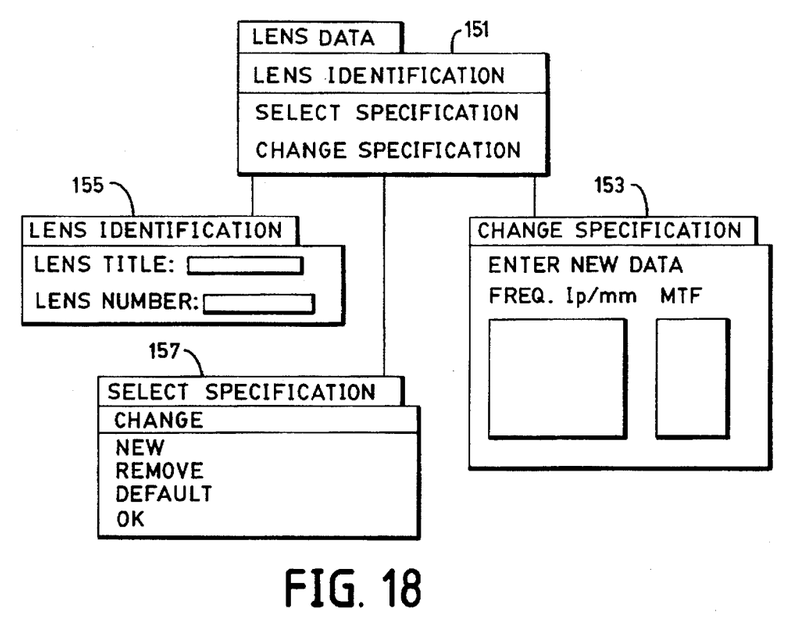
FIG. 18 shows, in sequence, the drop-down and pop-up menus functions generated in response to first activating the "Lens Data" function available under the menu bar of FIG. 4 and then making various selections from the options available under the drop-down menu therefrom.

The "Options" function of drop-down menu 120 of FIG. 13 permits the user to display lens specifications stored on disk as a file and to compare those with measurements on a "Go/No-Go" basis. When this option is selected the Go/No-Go status bar 100 is displayed in screen 84 at the bottom of it along with the result of the comparison. As best seen in FIGS. 13 and 18, when the "Display Specification" option is selected from drop-down menu 126, drop-down menu 151 is produced along with the possibility for three pop-up menus 153, 155, and 157, all of which are used with the shown dialog boxes for identifying test lens 13 and its performance specifications.

Figure 15:
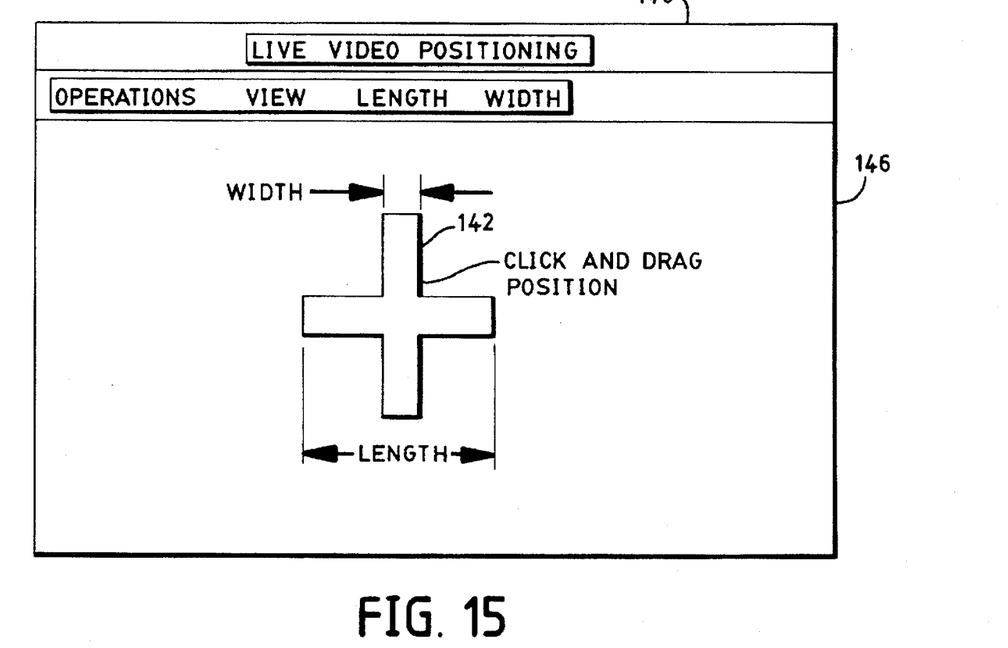
FIG. 15 shows the sub-window generated in response to activating the "Set Video" command button under the "Real-Time Scan" window of FIG. 10.
Figure 16:
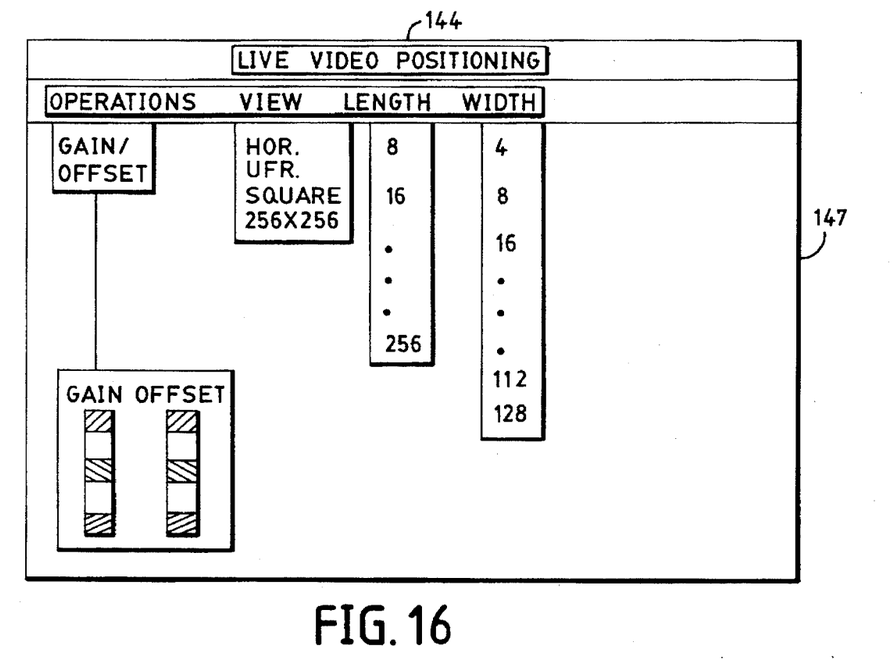
FIG. 16 shows the sub-window along with its drop-down menu functions generated in response to activating the "Operations" function from the menu bar of the "Live Video Positioning" window of FIG. 15.

Referring now to FIG. 10, command box 92, when activated, produces subwindow 140 entitled "LIVE VIDEO POSITIONING". This function permits the user to select what part of the image and where in it measurements will be made. As can be seen in the working area of subwindow 140, a cross 142 appears and, as well, on live video monitor 30 along with image 144 formed by test lens 13. The location of cross 142 with respect to image 144 may be controlled by clicking and dragging on it with mouse 24. The size of the number of pixels covered by cross 142 is adjusted by selecting various menu options available in menu bar 147 which appears in subwindow 144. Thus, as shown best in FIG. 16, selection of the "Operations" option allows for adjustment of gain and offset of the video camera 16; "View" permits the cross to be reduced to just a horizontal or vertical bar or a square of 256×256 pixels. The length of the cross arms and its width may be adjusted by choosing options "Length" and "Width" respectively.

After placing cross 142, the user then selects whether a line spread function or edge trace is to be done by activating control button 110 to toggle between those two possibilities represented at 102 and 104, respectively. Similarly, the user also activates control button 112 to toggle between selections 106 for an "Uncorrected MTF" or 108 for a "Corrected MTF".

Figure 12:
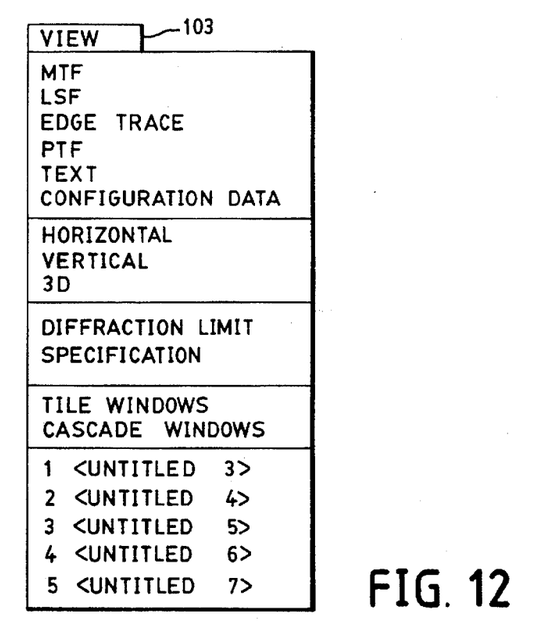
FIG. 12 shows the drop-down menu generated in response to selecting the "View" option available in the menu bar of the window of FIG. 11.

Once the position of cross 142 has been set, the measurement to be made selected and whether it is to be corrected or not, the user starts making measurements by activating "Start/Stop" control button 94 shown in subwindow 84 in FIG. 10. On doing this, the line spread function or edge trace is automatically displayed in graph box 88 and the uncorrected or corrected MTF in graph box 90. Activation of control button 96, "Grab Data", freezes the measurement and displays the latest result in graph boxes 88 and 90. To exit subwindow 84, the user activates control button 98 ("OK") which then causes window 101 of FIG. 11 to be displayed in which the current contents of graph box 90 of FIG. 10 is displayed as, for example, in sub-window 109 of window 101. However, the contents of sub-window 109 can be altered by the user to include the results of a variety of image analyses in either graphical or text form by making various choices available under the "View" option of the menu bar of window 101. As shown in FIG. 12, selecting the "View" option generates drop-down menu 103 which is partitioned into a number of subboxes which permit only one of the displayed options to be selected. The meaning of the various choices under drop-down menu 103 are as follows:

| Option | Description |
| --- | --- |
| "MTF" | The corrected modulation transfer function. |
| "LSF" | The line spread function. |
| "Edge Trace" | The edge trace taken through the image. |
| "PTF" | The phase transfer function. |
| "TEXT" | Data displayed as an array of alphanumeric characters. |
| "Config. Data" | The configuration of the system under which the data and analysis was generated. |
| "Horizontal/ Vertical" | The axes along which the measurement was made. |
| "Diffraction/ | Displays the diffraction limited performance or the |

-continued

| Option | Description |
| --- | --- |
| Specification" | user selected specification on graphical displays. |
| "Tile/ Cascade" | Multiple measurements may be grabbed and displayed in one of these two display formats. Select%g Cascade arranges the particular form of display as shown one behind the other as, for example, sub-windows 105 and 107 arranged behind 109 in FIG. 11. Selecting tile arranges display sub-windows as an array with each aside of the other. |
| "<Untitled>" | The user entered title of the measurement made. Otherwise, the system automatically assigns the default identification shown for "grabbed" measurements. |

Figure 19:
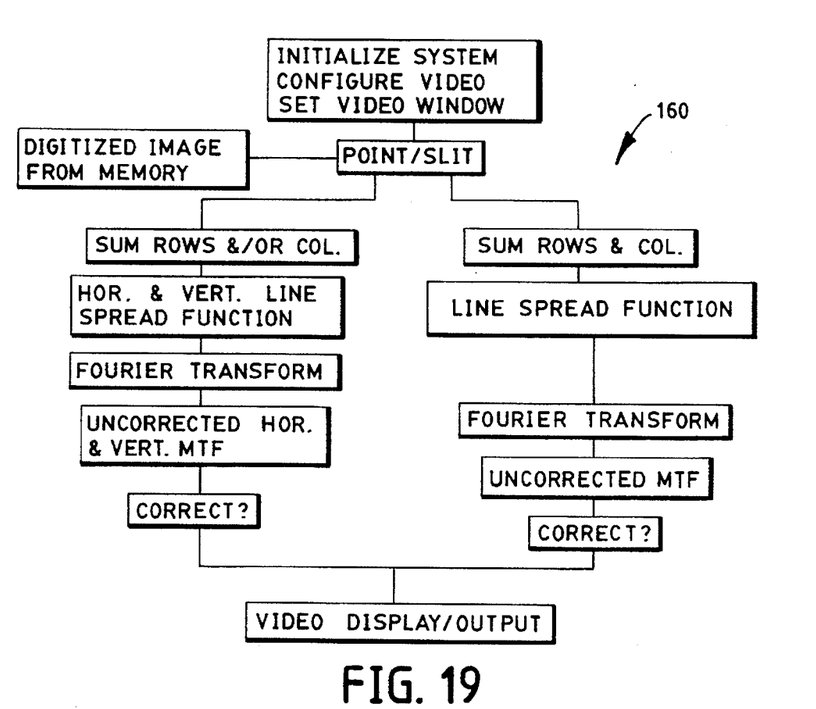
FIG. 19 is a diagrammatic flow chart of the various steps of the algorithm used to calculate and display various lens parameters that can be measured and displayed by the inventive system.

The algorithm that is used to calculate the line spread function, edge trace and uncorrected and corrected MTF's is shown in FIG. 19 at 160. System 10 is first initialized and configured, cross 142 positioned, and the system informed about whether a point or slit target is presented to test lens 13. The digitized image from memory 58 is provided, i.e., the intensity at each of the pixels in image 144 is known as a array. If a point source has been used, the rows and columns of the array of data are summed to generate the two-dimensional or horizontal and vertical line spread functions as shown in graph box 88 in FIG. 10. The Fourier transform of the horizontal and vertical line spread function is then done to generate the uncorrected MTF. If the corrected MTF is desired, the uncorrected MTF is divided by the MTF or all the other contributing system components. In either case, result is displayed in graph box 90 in FIG. 10 and also may be outputted to files or other output devices.

The calculations are carded out using the following equations which closely approximate the closed form equivalents:

$$A_c(u) = \frac{\Sigma A(x)\cos 2\pi u x \Delta x}{\Sigma A(x) \Delta x}$$

$$A_s(u) = \frac{\Sigma A(x)\sin 2\pi u x \Delta x}{\Sigma A(x) \Delta x}$$

where $\Delta x$ corresponds to pixel separation, $A(x)$ is the value of the line spread function at x obtained by summing columns and normalized to unity at zero spatial frequency, and $\nu$ is spatial frequency, i.e., $$MTF_{norm} = \frac{MTF(u)}{MTF(O)}$$

The modulation transfer function is then computed by:

$$MTF(u) = \frac{M_i(u)}{M_o(u)}$$

where:

$$M(u)=|A(v)|=[A_c^2(v)+A_s^2(v)]^{(1/2)}$$

For a slit target the same equations are used, except that either rows or columns are summed and then the line spread function is integrated and Fourier transformed to obtain the uncorrected MTF with the results displayed corrected or uncorrected as before.

Figure 17:
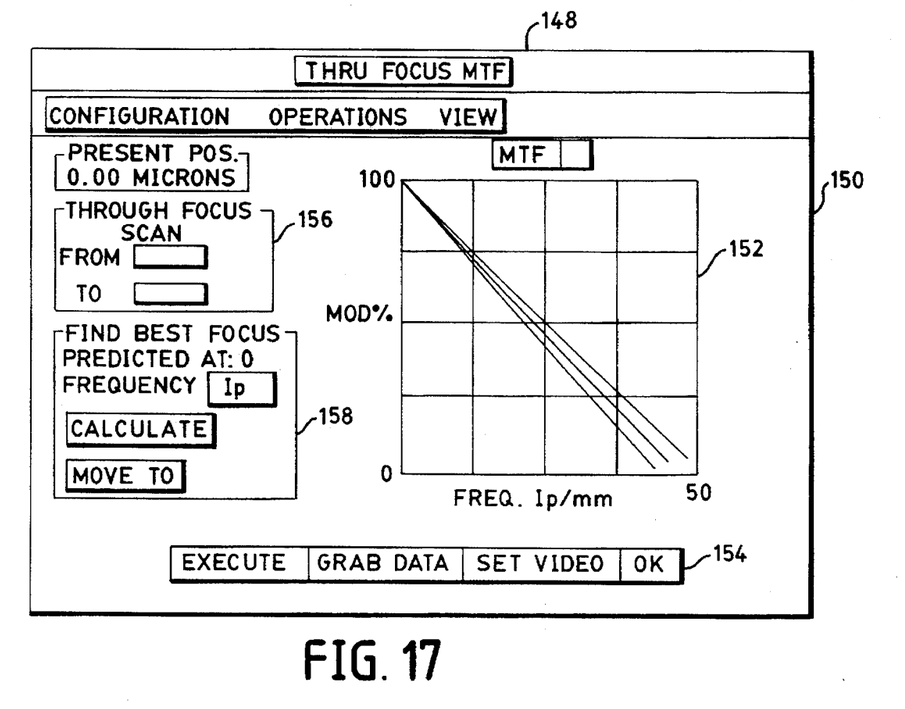
FIG. 17 shows the sub-window generated in response to activating the "Thru Focus MTF" Selection under the "Operations" drop-down menu of FIG. 5, in turn generated from selecting the "Operations" function from the main window menu bar shown in FIG. 4.

Referring now to FIG. 17, there is shown subwindow 148 entitled "THRU FOCUS MTF" and is generated in response to selecting the option by that name from drop-down menu 74 of FIG. 5 which in turn is generated from selecting the "Operations" option from menu bar 66 of main window 68 of FIG. 4. The "Thru Focus Option" allows image analysis to be performed on test lens 13 as a function of its state of focus or position along axis z in FIG. 1. Thus MTF or line spread function can be measured in real-time and displayed as the user moves test lens 13 along the z-axis.

Other measurements such as the PTF are carried out similarly to the one used to make the above calculations. The graphical display of PTF is phase angle ±180 degrees as a function of spatial frequency in lp/mm.

As can be seen in FIG. 17 subscreen 148 includes a menu bar 150 containing options "Configuration"; "Operations", and "View". These options have the same meaning as those of the same name under subwindow 84 of FIG. 10.

In the workspace of subwindow 148 there is a graph display box 152 which displays the lens parameter measured such as MTF in real time as a function the position of test lens 13, a control button bar 154, and dialog boxes 156 for setting the range of travel of test lens 13 and 158 for entering the estimated position of best focus and for initiating commands to "Calculate" and "Move to".

As before, the "Set Video", "Execute", and "Grab Data" control buttons of bar 154 permit the characteristics of the video system to be set, allow the user to instruct the system to start the measurements in real-time, and to "grab" the data when satisfied by what appears in graphic box 152. Activating "OK" returns to the previous level.

Other variations of the invention will be obvious to those skilled in the art. For example, it is possible through the use of available video display boards to display the image in video monitor 20 along with cross 142 instead of in live monitor 30.

Those skilled in the art may make still other changes without departing from the scope of the teachings. Therefore, it is intended that the embodiments shown herein be considered as illustrative and not in a limiting sense.

What is claimed is:

1. Apparatus for testing optical components in real-time, said apparatus comprising:

means for holding and positioning an optical component for evaluation;

means for presenting an illuminated target to said optical component so that said optical component can form an image of said target in a measurement plane, said target being selected from the group consisting of a pin hole, slit, or edge;

a video camera for viewing said image of said target in said measurement plane and generating a standard video signal thereof whose amplitude varies over the spatial extent of said image in correspondence with its intensity;

a frame grabber for capturing at least one frame of said video signal;

means for digitizing said frame of said video signal as an array of data representative of the spatial variation in said amplitude of said video signal and for at least temporarily storing said array of data; and means for performing real-time image analysis on said array of data and displaying the results of said image analysis as said image analysis is performed, including generating from said array of data the line spread function of the optical component along at least one azimuth thereof.

2. The apparatus of claim 1 wherein said means for digitizing and storing comprises an analog to digital converter and a memory buffer.

3. The apparatus of claim 2 wherein said video camera includes a two-dimensional array having a predetermined pixel geometry.

4. The apparatus of claim 3 wherein said two-dimensional array comprises a CCD.

5. The apparatus of claim 3 further including optical means for selectively changing the size of said image formed by said optical component as it is presented to said video camera so as to optimize the apparent resolution of said image.

6. The apparatus of claim 1 wherein said means for holding and positioning an optical component for evaluation comprises means for moving said optical component and said video camera relative to one another along at least one of three mutually orthogonal axes one of which coincides with the optical axis of said optical component.

7. The apparatus of claim 6 wherein said means for holding and positioning an optical component for evaluation further comprises means for selectively changing the angular orientation of said optical component relative to said target and said video camera.

8. The apparatus of claim 1 wherein said means for performing image analysis on said data form and displaying the results as said image analysis is performed comprises a computer with a graphical user interface (GUI), said computer comprising means for summing rows and columns of said array of data to generate line spread functions for said optical component and for performing Fourier analysis on said line spread functions to generate modulation transfer function(s), MTF, for said optical components.

9. The apparatus of claim 8 wherein said graphical user interface comprises a video monitor for displaying windows, menus, submenus, dialog boxes, and icons representing apparatus functions and includes a user input device for selecting from said windows, menus, submenus, dialog boxes and icons.

10. The apparatus of claim 9 wherein said computer with said video monitor further graphically displays the measured performance of said optical component.

11. The apparatus of claim 8 wherein said computer further includes means for indicating the part of said image that is used to carry out said image analysis.

12. The apparatus of claim 11 wherein said means for indicating the part of said image that is used comprises a part of a computer graphical user interface including a window that permits the user to select the size and orientation of said part of the image to be used.

13. The apparatus of claim 1 wherein said means for performing image analysis on said array of data and displaying the results as said image analysis is performed comprises means for calculating and displaying the uncorrected and corrected line spread function and MTF of said optical component.

14. The apparatus of claim 13 wherein said means for performing image analysis on said data form and displaying the results as said image analysis is performed comprises means for moving said optical component along at least one axis and performing and displaying said image analysis as said optical component is moved.

15. The apparatus of claim 1 further including means for displaying said image of said component is further configured to display said image as said component is being tested.

* * * * *